United States Patent
Reiner et al.

(10) Patent No.: US 7,904,909 B1
(45) Date of Patent: *Mar. 8, 2011

(54) ARCHITECTURE FOR USING A MODEL-BASED APPROACH FOR MANAGING RESOURCES IN A NETWORKED ENVIRONMENT

(75) Inventors: David Stephen Reiner, Lexington, MA (US); George M. Ericson, Shrewsbury, MA (US); Edgar StPierre, Fall River, MA (US)

(73) Assignee: EMC Corporation, Hopkinton, MA (US)

( * ) Notice: Subject to any disclaimer, the term of this patent is extended or adjusted under 35 U.S.C. 154(b) by 1266 days.

This patent is subject to a terminal disclaimer.

(21) Appl. No.: 11/394,701

(22) Filed: Mar. 31, 2006

(51) Int. Cl.
*G06F 9/46* (2006.01)
*G06F 15/173* (2006.01)
*G06F 9/44* (2006.01)

(52) U.S. Cl. ......... 718/104; 709/223; 709/224; 709/226; 717/127

(58) Field of Classification Search .................. 718/104; 709/226; 703/21
See application file for complete search history.

(56) References Cited

U.S. PATENT DOCUMENTS

| | | | |
|---|---|---|---|
| 5,809,235 A | 9/1998 | Sharma et al. | |
| 5,974,237 A | 10/1999 | Schumer et al. | |
| 6,256,773 B1 | 7/2001 | Bowman-Amuh | |
| 6,907,395 B1 * | 6/2005 | Hunt et al. | 703/21 |
| 6,985,901 B1 | 1/2006 | Sachse et al. | |
| 7,315,897 B1 | 1/2008 | Hardee et al. | |
| 7,668,910 B2 * | 2/2010 | Dinges et al. | 709/204 |
| 2005/0027850 A1 | 2/2005 | Menzies et al. | |
| 2005/0240621 A1 | 10/2005 | Robertson et al. | |
| 2006/0178918 A1 | 8/2006 | Mikurak | |
| 2007/0179823 A1 | 8/2007 | Bhaskaran et al. | |

* cited by examiner

*Primary Examiner* — Emerson C Puente
*Assistant Examiner* — Camquy Truong
(74) *Attorney, Agent, or Firm* — Krishnendu Gupta; Joseph D'Angelo

(57) ABSTRACT

An architecture including a model-based management layer for managing resources and applications, and a method of software and resource management enabled by such an architecture.

18 Claims, 9 Drawing Sheets

MASE EXAMPLE: APPLICATION SERVICE MANAGEMENT — 300

| | |
|---|---|
| CONTROL | ADMIN CREATES RESPONSE TIME POLICY FOR ONLINE ORDER TRANSACTIONS |
| MONITOR | BEGIN TO MONITOR RESPONSE TIME |
| ANALYZE | PERIODICALLY CHECK IF AVERAGE RESPONSE TIME < 5 SECOND THRESHOLD |
| ANALYZE | DETECT HIGH AVERAGE RESPONSE TIME FOR ORDERING! |
| ANALYZE | DETERMINE THAT ALL APP SERVERS HAVE HIGH CPU UTILIZATION |
| STRATEGIZE | CONSIDER OPTIONS; DECIDE TO DEPLOY ADDITIONAL APP SERVER |
| EXECUTE | CREATE WORKFLOW TO DEPLOY NEW DEVICE |
| EXECUTE | ENACT & MANAGE WORKFLOW |
| ACTIONS | PROVISION SERVER & UPDATE LOAD BALANCERS |
| MONITOR | CONTINUE MONITORING OF RESPONSE TIME KPI |
| ANALYZE | VERIFY THAT AVERAGE RESPONSE TIME IS NOW UNDER 5 SECONDS |
| CONTROL | NOTIFY APPLICATION ADMINISTRATOR OF SITUATION & ACTIONS |
| CONTROL | ADMIN INFERS QUEUING PROBLEM BETWEEN APP SERVER & DB |
| CONTROL | DEVELOPERS CREATE "FIX" FOR INTERFACE BETWEEN DB & APP SERVER |
| STRATEGIZE | PLAN TO IMPLEMENT FIX |
| EXECUTE | DISTRIBUTE FIX TO APP SERVERS & DE-ALLOCATE EXTRA SERVER |

FIG. 7

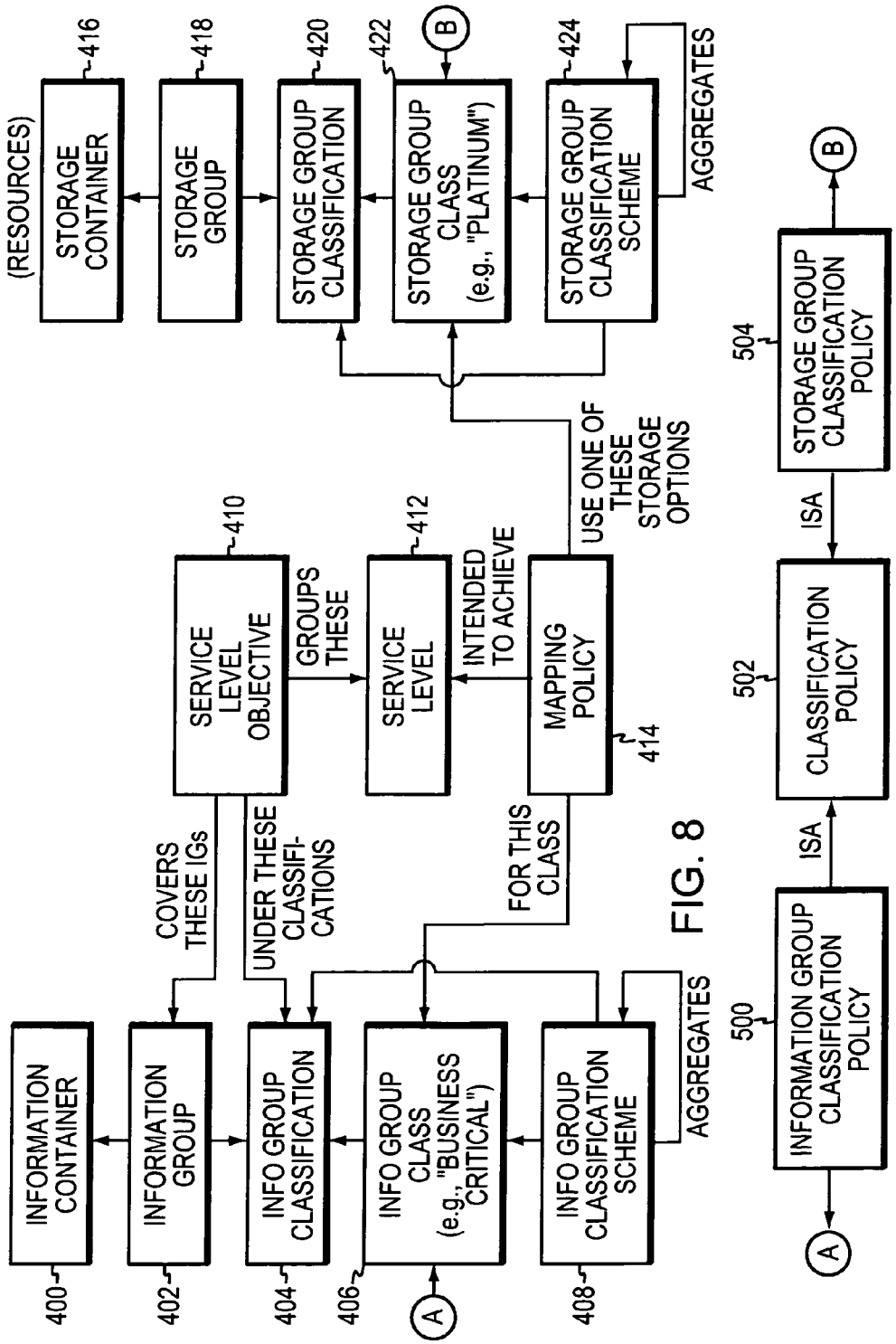

ARCHITECTURE FOR USING A MODEL-BASED APPROACH FOR MANAGING RESOURCES IN A NETWORKED ENVIRONMENT

This U.S. patent application is related to an application with Ser. No. 11/395,429 entitled "Method and Apparatus for Resource Management with a Model-Based Architecture" being filed on even date to inventor Reiner et al. and assigned to EMC Corporation of Hopkinton, the same assignee as this application.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

RELATED APPLICATION

This U.S. patent application is related to an application with S/N (to be determined) entitled "Method and Apparatus for Resource Management with a Model-Based Architecture" being filed on even date to inventor Reiner et al. and assigned to EMC Corporation of Hopkinton, the same assignee as this application.

FIELD OF THE INVENTION

The invention relates generally to software for computer systems including Data Storage Systems, and more specifically, to an architecture including a model-based management layer for managing resources and applications, and a method of software and resource management enabled by such an architecture.

BACKGROUND OF THE INVENTION

To be competitive, businesses must align the management of computer-based information technology (IT) resources with the service goals of business software applications. While there are domain-specific solutions to bridge business applications and to link them to IT resource management, a combination of competing standards, fragmented scope and missing links keeps these solutions from being either unified or successful. Web services adhere to a service-oriented architecture (SOA) that facilitates integration of legacy applications. Taken alone, existing Web services lack the deep semantics to link business applications to IT infrastructure. And while there are good foundations for resource management in the IT environment, known ones such as the Distributed Management Task Force (DMTF) Common Information Model (CIM) do not facilitate end-to-end management using multiple solutions, products and components in a consistent and unified way. Moreover, complications in a Data Storage Environment add to the complexity but resources in such an environment need to be managed as seamlessly as possible with other IT resources, locally or distributed. What is needed is a solution to the complexities described above in a manner that is efficient and extendable.

SUMMARY OF THE INVENTION

To overcome the problems and provide the advantages that have been described above, the present invention in one embodiment is an architecture for enabling management software applications to manage resources in a heterogeneous networked environment. The architecture includes a model-based management layer enabled for providing modeled instances of objects representing resources that are accessed by management software applications. The model-based management layer includes extension models and profiles for extending a common-object based model component within the architecture. It also includes a service interface that is used for communicating by the model-based management layer. It further includes a mediation layer that communicates with the model-based management layer through the service interface for managing resources that have service providers that are not compliant with the service interface requirements of the model-based management layer.

The extension models and profiles allow the management software applications to manage resources logically grouped in information groups and resource groups and selectively classified according to classification policy for carrying out resource services and applying resource policies, wherein such services and application of policies are enabled by the model-based management layer. Such managed resources include servers, data storage volumes, data storage systems, information, business processes, and other software applications.

BRIEF DESCRIPTION OF THE DRAWINGS

The above and further advantages of the present invention may be better understood by referring to the following description taken into conjunction with the accompanying drawings in which:

FIG. 7 is an exemplary diagram showing application interactions with the architectural components of FIGS. 1 and 2 and the functional modules of FIGS. 4, 5, and 6;

FIG. 8 is a block diagram of groups and classification of information and storage resources useful by the model-based architecture for applying policy, invoking services, and managing resources in the architecture depicted in FIGS. 1 and 2;

FIG. 9 is a block diagram of classification policy applied to information and resources.

DETAILED DESCRIPTION OF THE PREFERRED EMBODIMENT

Figure 1:
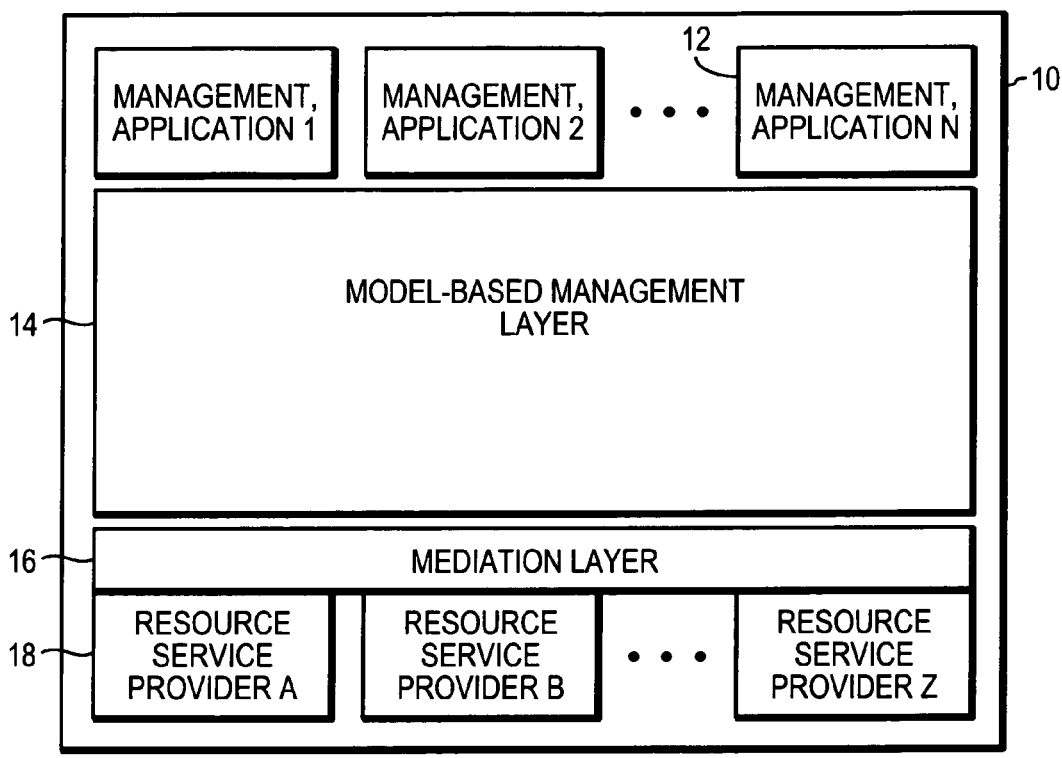
FIG. 1 is an overview of a model-based architecture embodiment of the invention.

The methods, apparatus, and architecture of the present invention are intended for use in management of software and resources including networked computers, software applications, and/or data storage systems, such as the CLARiiON Disk Array system or EMC's Symmetrix Data Storage System, each being available from EMC Corporation of Hopkinton, Mass. EMC software products, among others, which are useful with the invention include EMC SMARTS Service Assurance Manager, Networker, Replication Manager, Records Manager, and Content Intelligence Services.

Overview

The invention includes methodology enabled by a new model-based architecture that provides a new Model-based Management Layer that provides a foundation for model-based management software. The architecture extends and provides a common object model and a common management interface for task orchestration. It enables active management across heterogeneous business and IT domains. The architecture includes a middle layer with management application software above it and service providers below it.

The model-based architecture and the Model-based Management Layer enables reconciling the needs of different management disciplines into a single coordinated and consistent model. This enables orchestration across the different disciplines. Commonality and interoperability of application software in the form of Management Applications (see description of FIG. 1) come from the known DMTF Common Information Model (CIM) compatibility, from the integrated semantics and interfaces of the architectural embodiment of the invention described with reference to FIGS. 1 and 2 below, and from the known Storage Management Initiative—Specification (SMI-S) compatible base usage profiles defined. However, support for variation comes from the ability to specialize object classes, to extend the new model, and to define new profiles and patterns. Profiles are specifications of a model to accomplish specific goals. Basically Profiles constrain a more general model and describe its usage. For example, naming conventions and required properties are profiles.

The new Model-based Management Layer (FIG. 1) and the overall new architecture including this Layer are extensible. Through a management interface that enables applications and providers to invoke well defined, standardized and powerful service requests, the new architecture with its new extensions and functions facilitates programmatic composition, orchestration and reuse of providers' services in a Service Oriented Architecture (SOA).

The new architecture and methodology encompass certain principles. Many of these are architectural in nature: a new architecture including a common object model, extensibility mechanisms, use of profiles, new extensions and reconciliation of existing models, a new Model-based Management Layer, standards compliance, and industry partner compliance. A new process is enabled by the new architecture and referred to below as the MASE process. A goal of the inventors is to achieve reuse that simplifies and accelerates product design and development tasks, model-based management that orchestrates execution of underlying management tasks, and interoperability of heterogeneous products through common semantics.

Architectural and Methodology Embodiment Details

FIG. 1 shows a simple block diagram representing an architectural embodiment 10 including a Model-based Management Layer 14 that provides the modeled instances of managed objects and their attributes. Management applications 12 (1-N) access modeled instances of managed objects and their respective attributes and methods in accordance with the profiles to which service providers 18 provide conformance. A mediation layer 16 is provided for providers that are not compliant with the architectural specifications. A provider can support many different profiles depending on the needs of its applications. Service providers translate method invocations on modeled objects into service invocations.

Figure 2:
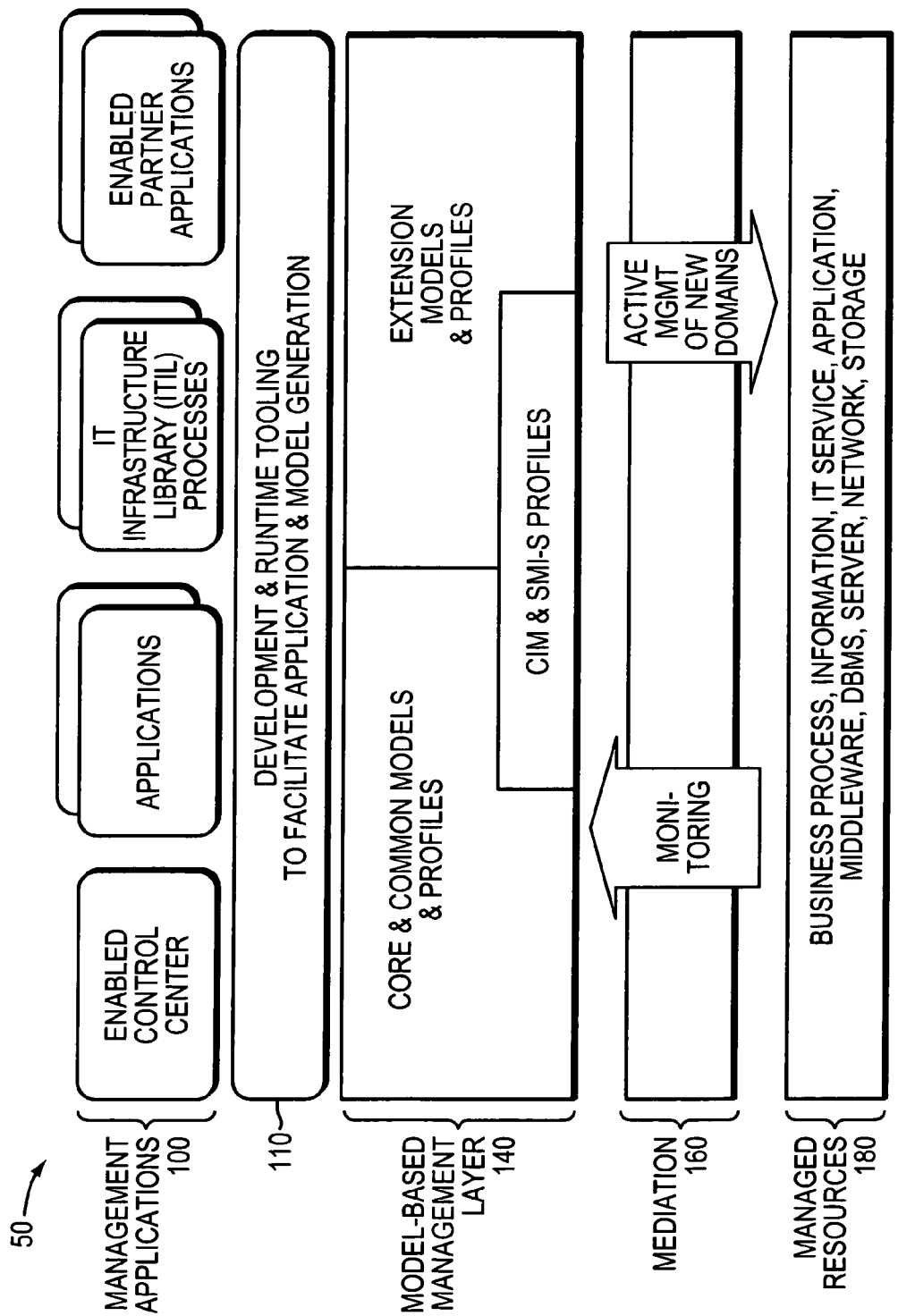
FIG. 2 is another view of a model-based architecture embodiment of the invention.

FIG. 2 shows another block diagram representing an architectural embodiment 50 including a Model-based Management Layer 140 that provides the modeled instances of managed objects and their attributes. The Model-based Management Layer includes core and common models and profiles and extensions models and profiles and may include well-known DMTF CIM and SMI-S profiles. A mediation layer 160 is provided for providers that are not compliant with the architectural specifications in particular service interface requirements. The Model-based layer provides monitoring and active management of new domains, optionally passing through the mediation layer.

Management Applications 100 access the modeled instances of managed objects and their respective attributes. Such Applications may include, for example, a Model-Enabled EMC Control Center Application, other Applications, IT Infrastructure Library (ITIL) Processes, and Model-Enabled 3$^{rd}$ Party or Business Partner Applications. Development and Runtime Tooling 110 facilitates application and model generation. Managed Resources 180 include various type of entities including a business process, information, IT service, application, middleware, DBMS, Server, network and storage.

Figure 3:
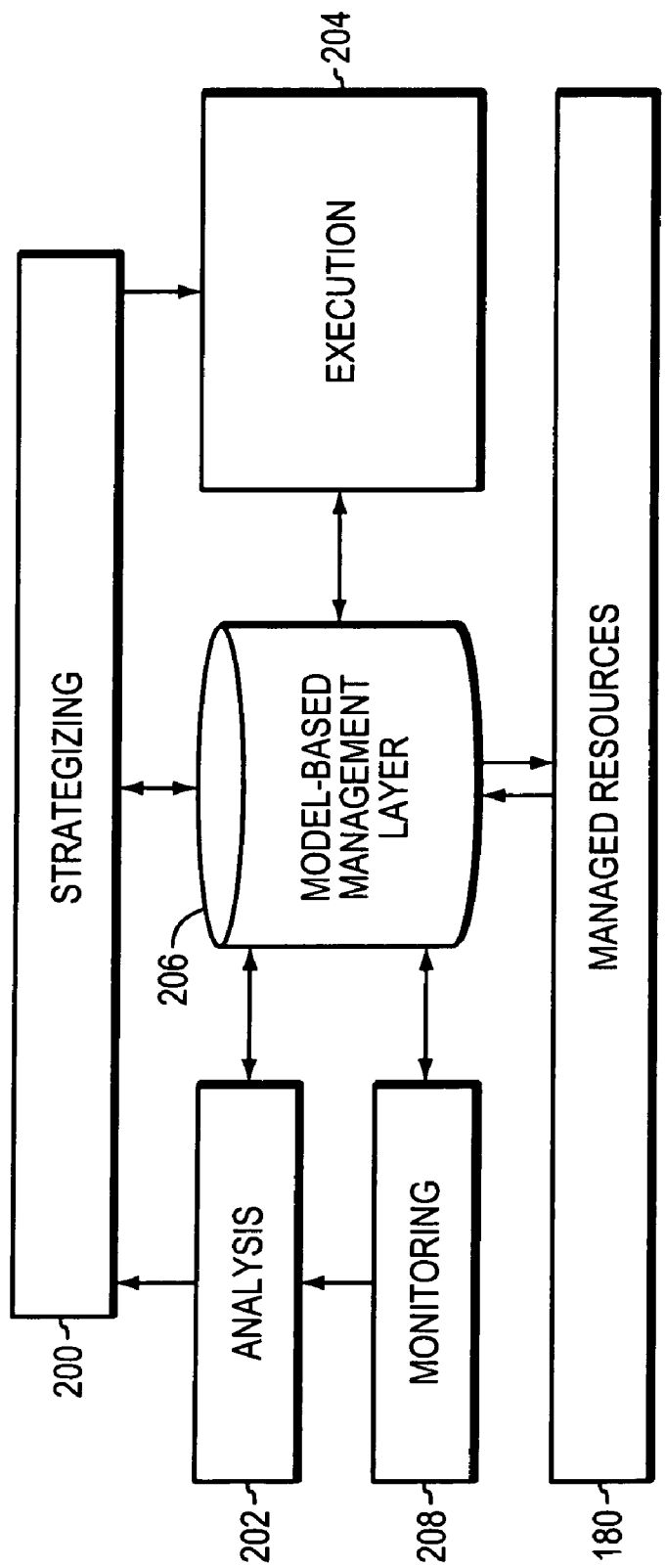
FIG. 3 is a functional block diagram describing a relationship of functional and processing modules enabled by the architecture embodiment of FIGS. 1 and 2.

FIG. 3 shows a process, which the inventors have referred to as the MASE process for using a Model-based Management Layer 206 that is a level of abstraction that incorporates the Model-based Architecture of FIGS. 1 and 2 for handling the Managed Resources 180 and also handles applications, such as the Management Applications 100 (FIG. 2). It is referred to as a MASE process to incorporate the functions it involves and enables as shown in the Functional and Processing Modules: Monitoring 208, Analysis 202, Strategizing 200, and Execution 204. In FIGS. 4-7, more detail is given about the MASE process and the Model-based Management Layer to explain the interactions made possible by the Model-based Architecture of FIGS. 1 and 2.

Figure 4:
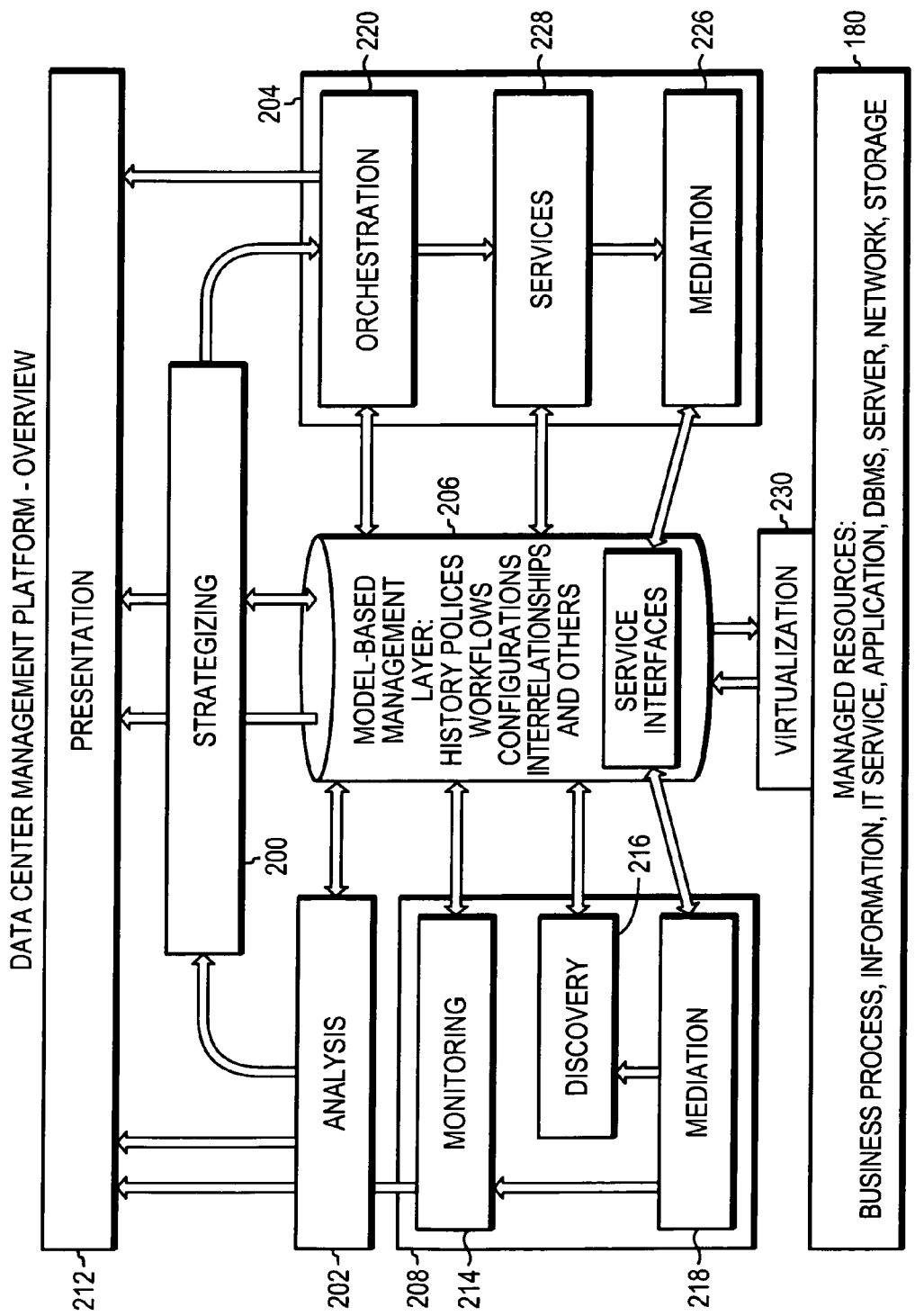
FIG. 4 is a detailed block diagram showing functional and processing modules in a relationship view including architectural components of FIGS. 1 and 2.

Referring to FIG. 4, an overview of a data center management platform including the Managed Resources 180 with a Virtualization Layer 230 communicates with the module Blocks 202, 208, 200, and 204 providing the MASE Functional and Processing Modules and passing up to the Presentation Layer 212 for the Managed Applications. The Model-based Management Layer 206 includes History, Policies, Workflows, Configurations, and Interrelationships information among other information provided through use of the Model. The Monitoring Module 208 includes Monitoring Sub-Module 214, Discovery Sub-Module 216, and a Mediation Sub-Module 218 that communicate with the Model-based Management Layer 206. The Execution Module 204 includes the Orchestration Sub-Modules 220, Services Sub-Module 228 that represent the various types of Actions that may be performed in accordance with the Management Application Goals related to Applications and Resources managed.

Mediation Sub-Modules 218 and 226 communicate with the Service Interfaces of the Model-based Management Layer, which in turn communicates with the Virtualization layer 230 for the Managed Resources 180. Also, Strategizing Module 202 and Analysis Module interact between and directly with the Presentation Layer and the Model-Based Management Layer that enables the functionality and processing capability of all the MASE modules as described herein.

The Model-based Management Layer and the overall architecture shown with functional and processing modules shown in FIG. 4 include class hierarchies that describe services, information and infrastructure resources, capabilities, organizations, business processes, policies, workflows and many other objects—as well as semantically-meaningful relationships among objects. The overall approach goes beyond the concept of configuration-tracking using Configuration Management Databases to enable model based management across business and IT domains.

Major areas of coverage for the Model-based approach described herein and some of their principal uses include:

- Applications (for tracking and management; mapped to organizations and to infrastructure)
- Associations and relationships (such as composition, ownership, event propagation, federation, dependency and adjacency)
- Behavior and its propagation characteristics (for root cause and impact analysis)
- Business processes (for mapping and tracking business relationships to the IT infrastructure)
- Classifications (of information groups, of storage and protection, of metrics)
- Configuration items (the aspects of servers, networks, storage, software, etc. used for asset and configuration management)
- Configurations and versioning (for configuration and change management, and for provisioning operations)
- Content (for access, incorporation, tracking, and other aspects of Information lifecycle management (ILM), which is an IT strategy based on the fact that not all information has equal value and the value changes over time. This strategy enables enterprises to more effectively manage their growing volumes of information—from creation to disposal—according to the information's changing requirements and to automatically align the information to the most appropriate resources, or to dispose of it, over time.
- Constraints (for maintaining correct semantics, specifying settings and capturing policies)
- Dimensions and aggregates (for multi-dimensional navigation and historical analysis)
- Documents (for creation, composition, distribution, routing, disposition, and other aspects of ILM)
- Events (for tracking, triggering, auditing and analysis)
- Expressions, filters, formats and queries (for selecting and constraining objects and activities)
- Files and file systems (for access, reference, and ILM)
- Incidents and problems (for tracking, root cause analysis and resolution)
- Information containers and groupings (includes files, directories, libraries, tables, tablespaces, etc.; for ILM)
- Management actions (for tracking, analysis, compliance, and optimization)
- Messages (for tracking and analysis)
- Metadata (for describing properties and constraints of objects)
- Methods (for describing invoked object behaviors)
- Metrics (for performance and service level management, for business continuity management)
- Models of object states and state transitions (for analysis and optimization)
- Networks (for tracking, analysis, management and optimization)
- Ontologies and taxonomies (for knowledge organization and mapping)
- Organizations (mapped to applications and infrastructure, for impact analysis, forecasting, etc.)
- Policies (for codifying, shaping and driving IT and business best practices; e.g. monitoring rules, ranging from polling frequency to event filtering and forwarding to diagnostic or corrective action in response to problems).
- Processes (for tracking and controlling object execution)
- Recovery points (copies of information groups for recovery purposes)
- Relationships (for tracking and acting on the semantics of object associations such as grouping, composition, ownership, etc.)
- Roles (such as Users)
- Schedules (to define and track task execution behavior)
- Security (for tracking and auditing, detecting issues, controlling access and operations)
- Servers (for tracking, analysis, management and optimization)
- Service Level Objectives and Agreements (for service level management)
- Services (in the SOA sense; to support identification and use of relevant packaged capabilities)
- Storage containers, groupings and capabilities (for tracking, analysis, management and optimization)
- Usage tracking (for chargeback and other accounting)
- Users, roles and permissions (for authorization, access, scheduling, automation and other management)
- Workflows and scripts (for capture and enforcement of best practices and constraints, and for guiding progress and tracking status)
- Workloads (for transaction and performance analysis)

Figure 5:
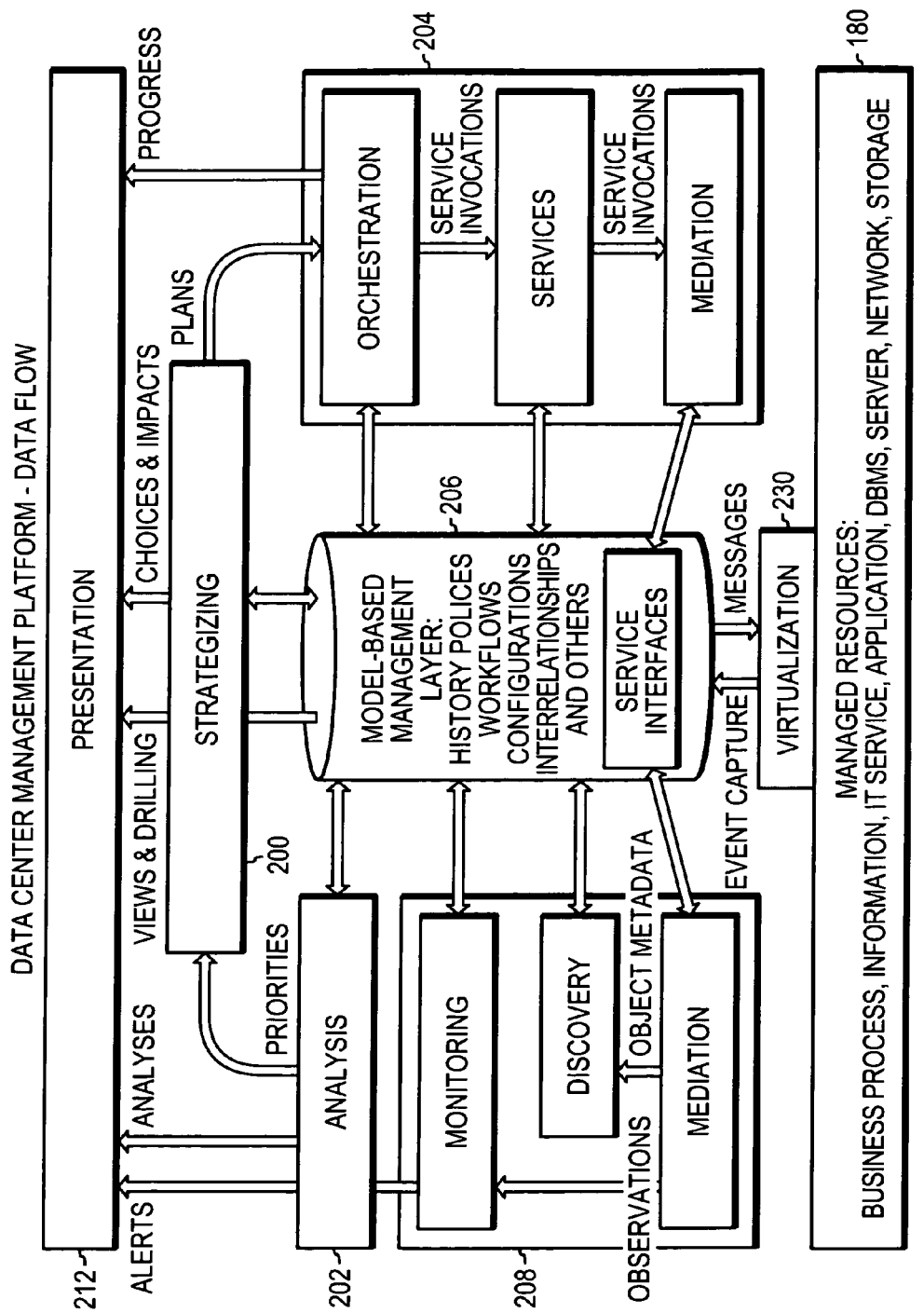
FIG. 5 is another detailed block diagram showing functional and processing modules in a relationship view including architectural components of FIGS. 1 and 2.

Referring to FIG. 5, a more detailed view of the platform discussed in FIG. 4 and including the architectural components of FIGS. 1 and 2 is discussed. In Monitoring Module 208, observations are passed between the Mediation Sub-Module and the Monitoring Sub-Module, while Object Metadata is passed to the Discovery Sub-Module. Communication to the Model-based Management Layer 206 occur directly from the Discovery Sub-Module and the Monitoring Sub-Module and through the Services Interface for the Mediation Sub-Module.

The Analysis Module 202 communicates priorities to the Strategizing Module 200 and also communicates directly with the Model-based Management Layer. The Analysis Module also passes data related to Alerts, and data related to Analysis for the Presentation Layer 212. The Strategizing Module 200 passes Views and Drilling data and Choices and Impacts data to Presentation Layer 212, while passing Plans to Execution Functional Module 204, and while communicating with the Model-based Management Layer 206.

Still referring to FIG. 5, the Model-based Management Layer 206 in turn communicates with the Execution Module 204. The Execution Module internally passes Service Invocations between the Orchestration Sub-Module and the Services Sub-Module. The Services Sub-Module issues other Service Invocations to the Mediation Sub-Module that, in turn, communicates with the Service Interfaces component of the Model-Based Management Layer 206. The Service Interfaces issue Messages to the Resource Service Providers 18 (FIG. 1) for Managed Resources 180 through the Virtualization Layer 230. Event Captures from the Managed Resources are passed to Service Interfaces from the Virtualization Layer for eventual handling within the Model-based Management Layer.

Figure 6:
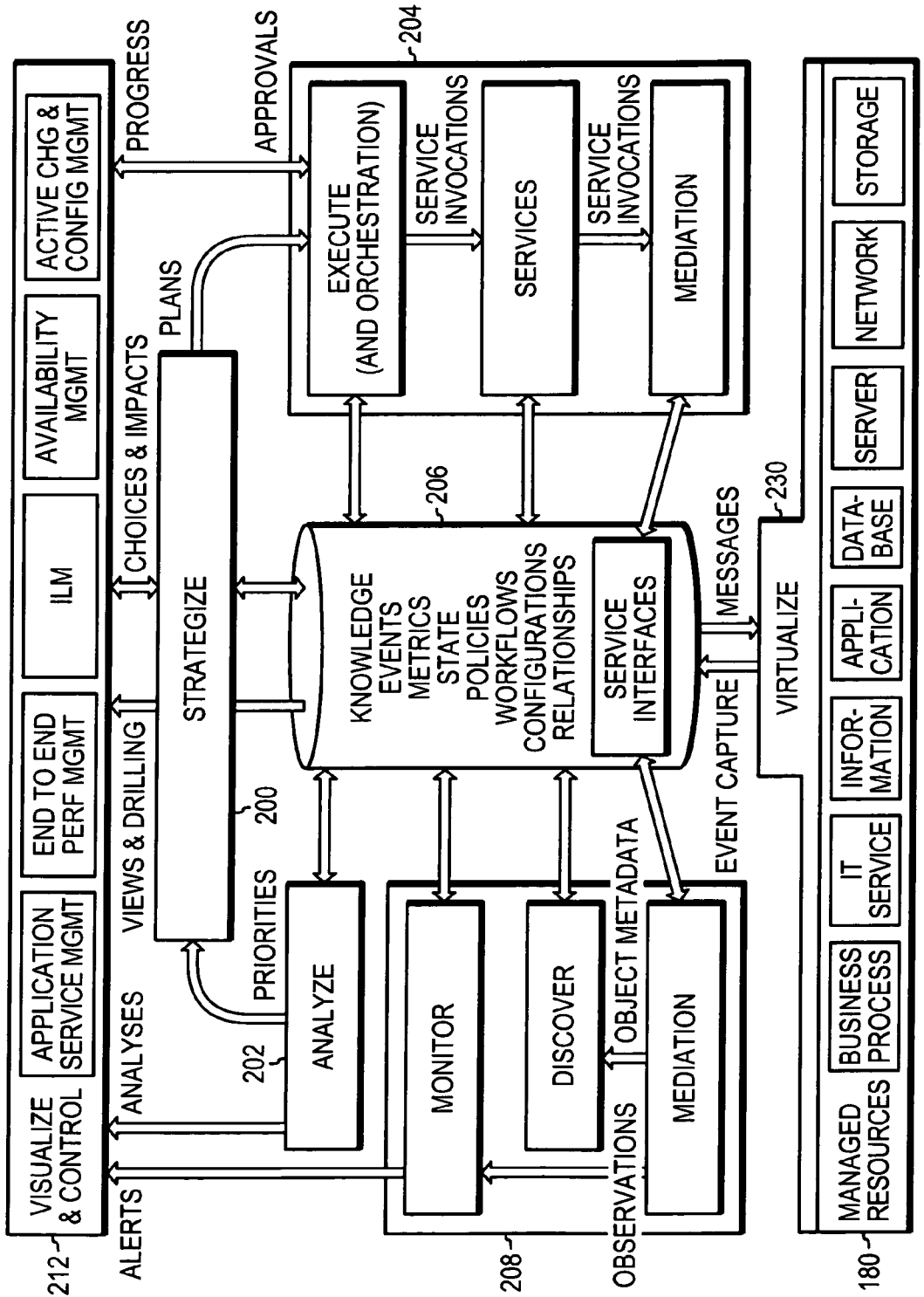
FIG. 6 is an example diagram showing functional modules and processing modules in a relationship view including architectural components of FIGS. 1 and 2.

Referring to FIG. 6, a more detailed but exemplary view of the platform discussed in FIGS. 4-5 and including the architectural components of FIGS. 1 and 2 is discussed. The Presentation Layer 212 includes capability for Visualize and Control, as shown includes examples of Management Applications. Such exemplary Applications include Application Service Management, End-to-End Performance Management, Information Lifecycle Management (ILM), Availability Management, and Active Change and Configuration Management.

In this example of the Application Services Management Application, the Visualize and Control presentation capability, which may be included as part of a Storage Management Program such as EMC Control Center or Navisphere, comprises web portal with a status dashboard. Further included may be visualization of application topologies, service level and management actions, capabilities for drilling into service issues, wizards for administration, tuning and configuration change.

The Strategize Module 200, as shown in FIG. 6, continues the example of a specific Management Application, i.e., the Application Services Management Application, which includes capability for policy-based management, optimization, advice on choices, what-if analysis, ITIL best practices, impact analysis of change requests, and configuration validation. In this example, the Analyze Module 202 includes capability for trending, profiling, threshold analysis, service levels, root-cause analysis of problems, and resource use studies. Further in development of the example, the Model-based Management Layer 206 includes capability for event history analysis, priority management, service level metrics, policies for discovery, monitoring, general analysis, strategy and action selection, workflows, and configuration relationships.

Still further in development of this example case, the Monitoring Model 208 includes capability within the Monitoring Sub-Module for correlation, de-duping, event capture, and metric computation. It further includes capability within the Discover Sub-Module for relationships of application to infrastructure and the Mediation Layer can capture and poll information from resources.

The Execution Module 204 includes capability with the Execute Sub-Module to JO coordinate workflow/policy across the entire MASE process. In this example case, the Services Sub-Module includes capability for provisioning, initializing, load-balancing, tuning, quiescing/restarting, element management, and configuration and change management.

FIG. 7 shows an example of an Application interacting in the Model-Based Architecture of FIGS. 1 and 2, with the Model-based Management Layer and MASE Process enabled by that Architecture and described with reference to FIGS. 3-6. The Example detailed in Block 300 is that of Application Service Management. Regarding terminology, Control in Example Block 300 refers to action in the Management Applications 100 Layer caused by the Applications Service Management application or application. In the Block 300, Monitor, Analyze, Strategize, and Execute refer to activities with the respective MASE process Modules, and Actions refer to activities orchestrated by the Execution Module.

In the example case, Control occurs when the Admin creates a response time policy for online order transactions. Monitoring begins to monitor the response time. Analyzing steps periodically check if the average response time is below the 5 second threshold. The Analyze Module detects a high average response time for ordering. It further determines that all application servers have high CPU utilization. Then the Strategize Module can be used to determine an action, which may involve human interaction. In this example, a choice is made with Strategize to deploy an additional application server.

Continuing with the example case shown in FIG. 7, the Execute Module creates a workflow to deploy a new application server device and enacts and manages workflow. Actions in this Execute Module provision the server and update the load balancers. The Monitor Module continues monitoring response times. The Analyze Module verifies that the average response time in now less than 5 seconds. The Control Module notifies the Application administrator of the situation and actions. The administrator may infer a queuing problem between the server and the database and create a fix. A plan to implement the fix is part of Strategize and distributing the fix is part of Execute.

FIG. 8 is a block diagram of groups and classification of information and resources useful by the model-based architecture for applying policy, invoking services, and managing resources in the architecture depicted in FIGS. 1 and 2. In the example case shown in FIG. 8, resources are shown as one type of resource, namely storage resources. It is useful for understanding applicability of the major areas of coverage for the Model-based approach described herein and some of their principal uses discussed above. An Information Group 402 is composed of one or more Information Containers 400. Information Group Classification 404 relates Information Groups to Information Group Classes. Service Level Objectives 410 are determined by classification. The Mapping Policy 414 is used to achieve Services Levels for a particular Information Group Class. The Service Level Objectives group the Service Levels 412 for convenience (e.g., Business Critical class).

Referring to FIG. 9, the Information Group Classification Policy 500 is applied to determine the Information Group Class 406, which may be for example a so-called Business Critical Class. Information Group Classification Policy 500, which is a (ISA) subclass of Classification Policy 502, assigns Info Group Classes 406 to Information Groups 402 producing Information Group Classification 404 in accordance with Scheme 408. Scheme 408 aggregates or combines other groups as needed. For example, a classification scheme for criticality may aggregate classification schemes for type, owner, age, and security of information. In other words, it may useful to combine an aggregation of information in order to give a better understanding for creating policies.

In a similar fashion, the Storage Group Classification Policy 504 ISA subclass of Policy 502. Policy 504 is applied to determine Class 422, which may be for example a so-called Platinum Class. Class 422 is assigned to Group 418. That assignment is Storage Group Classification 420 in accordance with Scheme 424. Scheme 424 aggregates or combines other groups as needed.

The Classification may be done selectively in accordance with the needs of the Management Applications wherein the selective classification is done in accordance with the Classification policy. For example, an ILM Management Application may need to classify resources or information, for example, in order to carry out an ILM function of handling information according to its classification and another type of Management Application may not have the same needs and therefore not need classification.

Referring again to FIG. 8 and also to FIG. 9, the Mapping Policy 414 uses one of the Storage Group Classes classified according to Policy 504 and a Storage Group Classification 420 for Storage Group 418 in Storage Container 416. The Storage Class may have certain characteristics, such as a so-called Platinum class which pertains to certain important storage resources in this example. Classification Policy 502 is specialized to create Resources, e.g. Storage, and/or Information Group Classification Policy to affect, among other things, data protection and other software and services in a networked environment. Resources also include software, including information management and data management software. The Model-based Management Layer takes advantage of such classifications and groups for enabling services on resources managed by Management Applications, such as the services described above, including for example Information Lifecycle Management (ILM), provisioning of storage, data protection, and other software and services.

Figure 10:
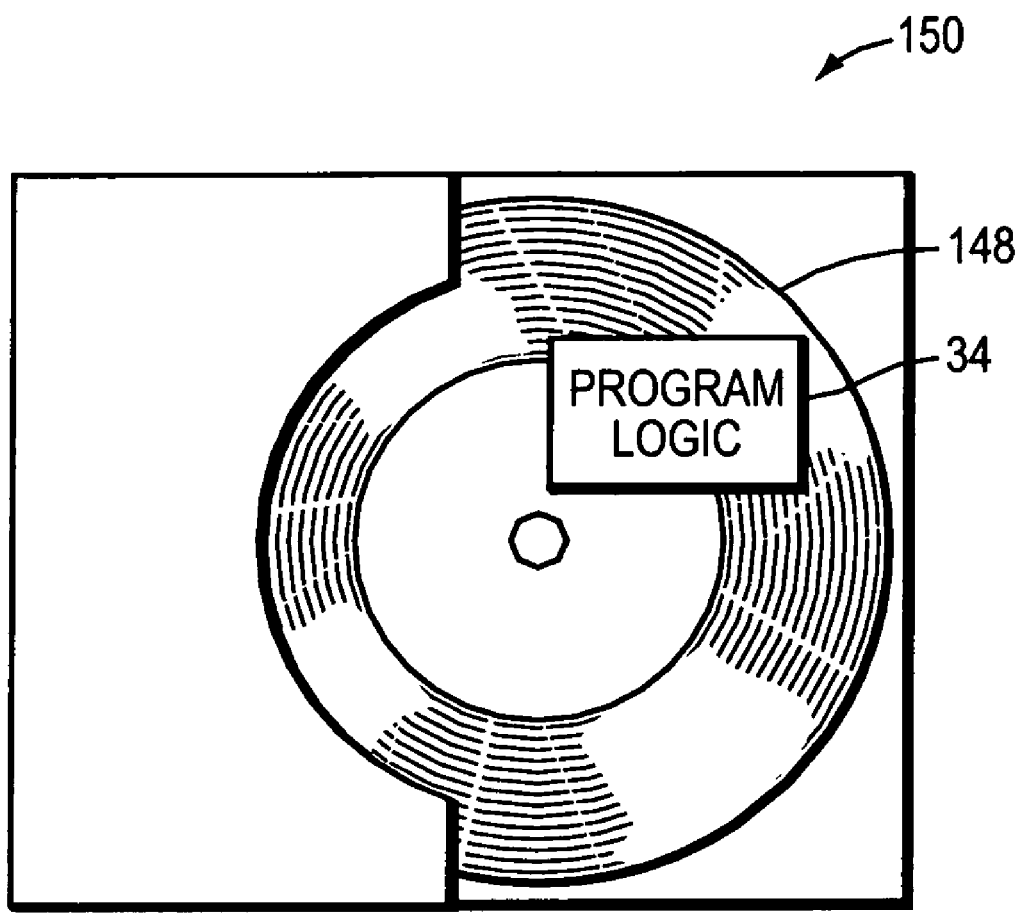
FIG. 10 is a computer program product including a computer-readable medium encoded with program logic capable of executing methodology described herein.

FIG. 10 shows a computer program product 150 including a computer-readable medium 148 encoded with computer program Logic 34 (software in a preferred embodiment). The Logic is configured for allowing a computer to execute the methodology described above. One skilled in the art will recognize that the Logic may also be loaded into conventional computer memory and executed by a conventional CPU. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the logic reconfigures a general purpose digital computer into a special purpose digital computer enabled for carrying out the process and methodology discussed herein. When implemented on a general-purpose processor, the program code combines with the processor of the computer to provide a unique apparatus that operates analogously to specific logic circuits.

A system and method has been described for a methodology based on a Model-based architecture that provides a Model-based Management Layer that provides a foundation for model based management software. The architecture provides a common object model and a common management interface for task orchestration across heterogeneous business and IT domains. The architecture includes a middle layer with management application software above it and service providers with resources below it.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. An architecture for enabling management software applications to manage resources in a environment and wherein such resources include servers, data storage volumes, data storage systems, information, software applications, and business processes and which the resources are in a heterogeneous networked environment, the architecture comprising:
   one or more processors embodying a model-based management layer for providing modeled instances, of objects representing the resources that are accessed by management software applications through the model-based management layer, wherein the model-based management layer includes extension models and profiles for extending a common-object based model component within the architecture, and the extension models and profiles allow the management software applications to manage resources logically grouped in information groups and resource groups and selectively classified according to a classification policy for carrying out resource services and applying resource policies, and the model-based management layer, a service interface, a virtualization layer, an execute module, and a mediation layer are configured for allowing management of the resources using monitoring module, analysis module, strategizing module, and execute module for carrying out processes of monitoring, analysis, strategizing, and execution, wherein;
   a strategize module strategizes a solution to a policy violation and is communicatively coupled to the execution module, the monitoring module comprises a mediation sub-module, monitoring sub-module, and a discovery sub-module; the monitoring sub-module includes a capability for correlation, de-duping, event capture, and metric computation the mediation sub-module and the monitoring sub-module are enabled to pass observations-and object meta-data is passed to the discovery sub-module;
   the analysis module analyzes compliance with the classification policy, and such that the analysis module further performs trending, profiling, and threshold analysis, and is communicatively coupled to the strategize module;
   the service interface communicates with the model-based management layer;
   the mediation layer communicates with the model-based management layer through the service interface for managing resources that have service providers that are not compliant with architectural specifications in service interface requirements of the model-based management layer,
   the virtualization layer abstracts information about the managed resources that communicates with the model-based management layer through the service interface, and
   the execute module comprises a services sub-module and an orchestration sub-module, the services sub-module performs the services of provisioning, initializing, load balancing, tuning, quiescing/restarting, element management, and configuration and change management; the services sub-module issues service invocations to the mediation layer; the service issues messages to resource providers for the managed resources through the virtualization layer; and the execute module executes the solution to ensure compliance with the classification policy.

2. The architecture of claim 1, and further including a development tooling layer that communicates with the model-based management layer and wherein the development tooling layer is useful for application and model generation.

3. The architecture of claim 1, wherein the model-based management layer includes a monitoring function for monitoring managed resources.

4. The architecture of claim 1, wherein resources groups, resource services and resource policies are, respectively, storage groups, storage services and storage policies.

5. The architecture of claim 1, wherein managed applications include an information lifecycle management application.

6. The architecture of claim 1, and further including a development tooling layer that communicates with the model-based management layer, wherein the development tooling layer is useful for application and model generation.

7. The architecture of claim 1, wherein the model-based management layer includes a monitoring function for monitoring managed resources.

8. The architecture of claim 1, wherein resources groups, resource services and resource policies are, respectively, storage groups, storage services and storage policies.

9. The architecture of claim 1, wherein managed applications include an information lifecycle management application.

10. The architecture of claim 1, wherein the model-based management layer includes instances of objects related to configurations useful for configuration and change management of applications or managed resources.

11. The architecture of claim 10, wherein the configuration and change management includes provisioning operations.

12. The architecture of claim 1, wherein the architecture enables specialization of object classes for Management Applications.

13. The architecture of claim 12, and further including a development tooling layer that communicates with the model-based management layer and wherein the development tooling layer is useful for application and model generation.

14. The architecture of claim 12, wherein the model-based management layer includes a monitoring function for monitoring managed resources.

15. The architecture of claim 12, wherein resources groups, resource services and resource policies are, respectively, storage groups, storage services and storage policies.

16. The architecture of claim 12, wherein managed applications include an information lifecycle management application.

17. The architecture of claim 12, wherein resource groups include software applications for information management and data management.

18. The architecture of claim 1, wherein resource groups include software applications for information management and data management.

* * * * *